(12) United States Patent
Chen (10) Patent No.: US 8,160,860 B1
(45) Date of Patent: Apr. 17, 2012

(54) METHOD AND APPARATUS FOR EVENT-BASED SIMULATION OF A DIGITAL DESIGN HAVING A POWER SHUT-OFF FEATURE

(75) Inventor: Yonghao Chen, Groton, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 413 days.

(21) Appl. No.: 12/414,239

(22) Filed: Mar. 30, 2009

(51) Int. Cl.
*G06F 17/50* (2006.01)
*G06G 7/62* (2006.01)
*G06G 7/54* (2006.01)

(52) U.S. Cl. ............... 703/16; 703/18; 703/17

(58) Field of Classification Search ............ 703/15, 703/16, 17, 18
See application file for complete search history.

(56) References Cited

U.S. PATENT DOCUMENTS

| | | | |
|---|---|---|---|
| 7,735,030 B1 * | 6/2010 | Kalil et al. | 716/136 |
| 7,944,285 B1 * | 5/2011 | Thirunavukarasu et al. | 327/544 |
| 2006/0291110 A1 * | 12/2006 | Kanno et al. | 361/18 |
| 2007/0245278 A1 * | 10/2007 | Chen | 716/5 |
| 2008/0071513 A1 * | 3/2008 | Chickermane et al. | 703/15 |

OTHER PUBLICATIONS

Chickermane, Vivek et al. "A Power-Aware Test Methodology for Multi-Supply Multi-Voltage Designs", Nov. 29, 2008, IEEE.*

* cited by examiner

*Primary Examiner* — Kandasamy Thangavelu
*Assistant Examiner* — Cedric D Johnson
(74) *Attorney, Agent, or Firm* — Holland & Knight LLP; Brian J. Colandreo, Esq.; Mark H. Whittenberger, Esq.

(57) ABSTRACT

Method, apparatus, and computer readable medium for simulating a logic design having power domains are described. In some examples, a switchable power domain of the power domains is identified, the switchable power domain having primary inputs and having a power state switchable between a power-on state and a power-off state. The logic design is traversed to analyze driver and load logic of each of the primary inputs to the switchable power domain to identify any pure pass-through nets each of which has no driver and no load logic in the switchable power domain. An implicit logic device is inserted at each of the primary inputs not coupled to a pure pass-through net, each implicit logic device being in a corrupting state when the switchable power domain is in the power-off state and in a bypassing state when the switchable power domain is in the power-on state, the corrupting state corrupting the respective primary input with an undefined logic state, the bypassing state driving the respective primary input with a logic state of respective driver logic. An event-driven simulation of the logic design is performed.

20 Claims, 7 Drawing Sheets

METHOD AND APPARATUS FOR EVENT-BASED SIMULATION OF A DIGITAL DESIGN HAVING A POWER SHUT-OFF FEATURE

BACKGROUND OF THE INVENTION

1. Field of the Invention

Embodiments of the invention generally relate to electronic design automation and, more specifically, to a method and apparatus for event-based simulation of a digital design having a power shut-off feature.

2. Description of the Related Art

In electronic design automation (EDA), functional verification is the task of verifying that a logic design conforms to its specification before the logic design is manufactured as integrated circuits (ICs). Functional verification can be performed using an event driven digital logic simulation system. Digital logic simulation systems simulate the functional behavior of a digital design and verify its correctness. Traditional logic simulation systems work under the assumption that the digital design is always powered-on. However, with semiconductor manufacturing feature size getting ever smaller and with ICs getting ever more complex, power consumption becomes a significant obstacle in digital design.

Power shut off (PSO) has emerged as a leading design technique to reduce power consumption in complex digital ICs. In PSO, a portion of a digital design is powered-down when unused, while another portion continues to operate, in order to conserve power. PSO poses significant challenges to the digital design verification process. Since traditional logic simulation systems assume an always powered-on state, such systems cannot adequately be used to functionally verify digital designs that employ PSO techniques.

Accordingly, there exists a need in the art for a logic verification system that can simulate digital designs employing PSO features.

SUMMARY OF THE INVENTION

Aspects of the invention relate to a method, apparatus, and computer readable medium for simulating a logic design having power domains. In some embodiments, a switchable power domain of the power domains is identified, the switchable power domain having primary inputs and having a power state switchable between a power-on state and a power-off state. The logic design is traversed to analyze driver and load logic of each of the primary inputs to the switchable power domain to identify any pure pass-through nets each of which has no driver and no load logic in the switchable power domain. An implicit logic device is inserted at each of the primary inputs not coupled to a pure pass-through net, each implicit logic device being in a corrupting state when the switchable power domain is in the power-off state and in a bypassing state when the switchable power domain is in the power-on state, the corrupting state corrupting the respective primary input with an undefined logic state, the bypassing state driving the respective primary input with a logic state of respective driver logic. An event-driven simulation of the logic design is performed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Throughout the drawings like reference numerals refer to like elements.

DETAILED DESCRIPTION

Figure 1:
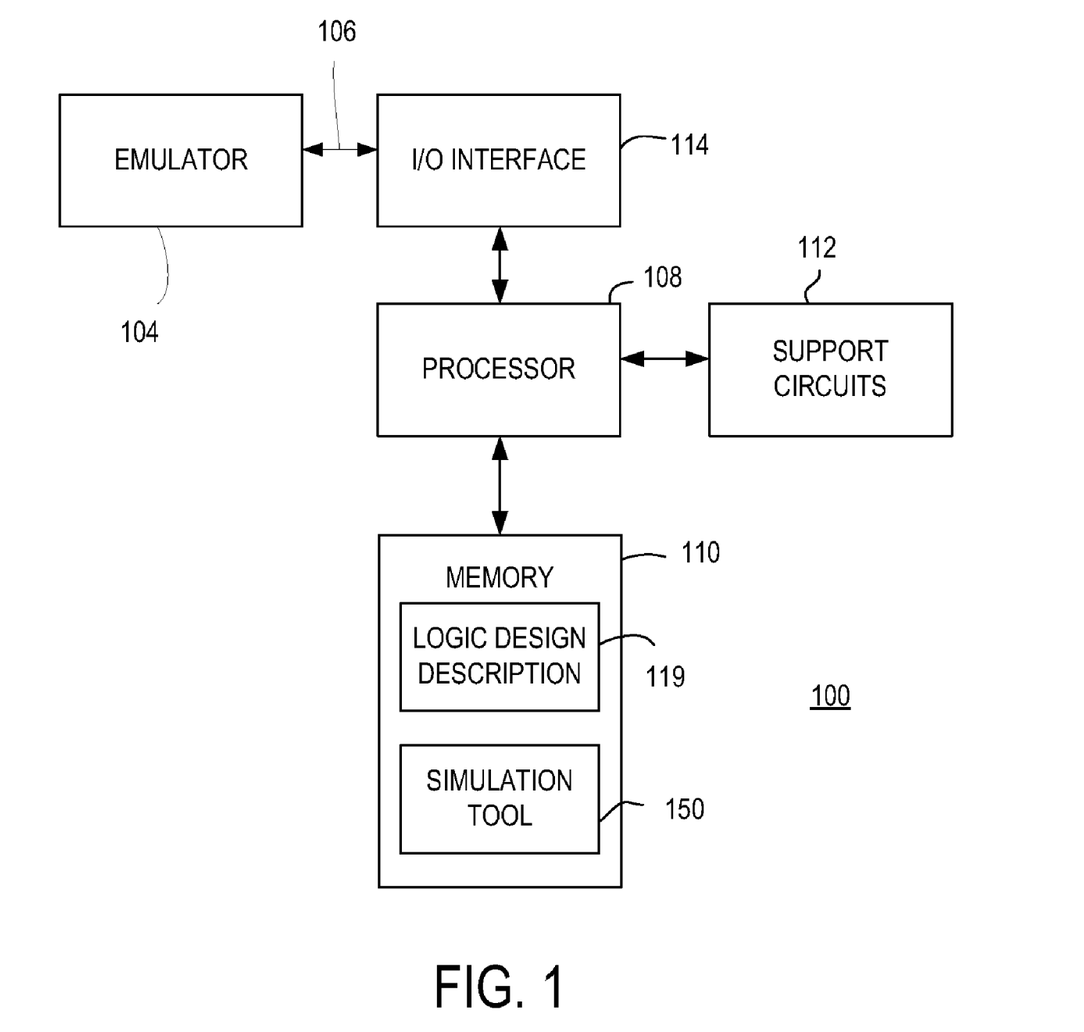
FIG. 1 is a block diagram of a computer according to some embodiments of the invention.

FIG. 1 is a block diagram of a computer 100 according to some embodiments of the invention. The computer 100 may comprise any type of general-purpose or specific-purpose computer. For example, the computer 100 may include a processor 108, a memory 110, various support circuits 112, and an I/O interface 114. The processor 108 may include one or more microprocessors known in the art. The support circuits 112 for the processor 108 include conventional cache, power supplies, clock circuits, data registers, I/O interfaces, and the like. The I/O interface 114 may be directly coupled to the memory 110 or coupled through the processor 108. The I/O interface 114 may also be configured for communication with the emulator 104 via the communication link 106. The memory 110 may include one or more of the following random access memory, read only memory, magneto-resistive read/write memory, optical read/write memory, cache memory, magnetic read/write memory, and the like, as well as computer readable media, as described below.

The computer 100 may be loaded with a simulation tool 150. The simulation tool 150 is configured to perform even-driven simulation of a logic design specified by a logic design description 119. The simulation tool 150 simulates the functional behavior of the logic design and can be used to verify the correctness of the logic design before the logic design is manufactured into an integrated circuit (IC). The logic design specified by the logic design description 119 includes a plurality of power domains. A "power domain" is a group of logic that operates according to a specified voltage or voltages. One or more of the power domains may be a "switchable power domain". A switchable power domain has a power state switchable between a power-on state and a power-off state. Switchable power domains enable the logic design to implement power shut off (PSO) features. As noted above, traditional simulators assume that all portions of a logic design are always powered-on. The simulation tool 150 is configured to perform proper simulation of the logic design having at least one switchable power domain.

Figure 2:
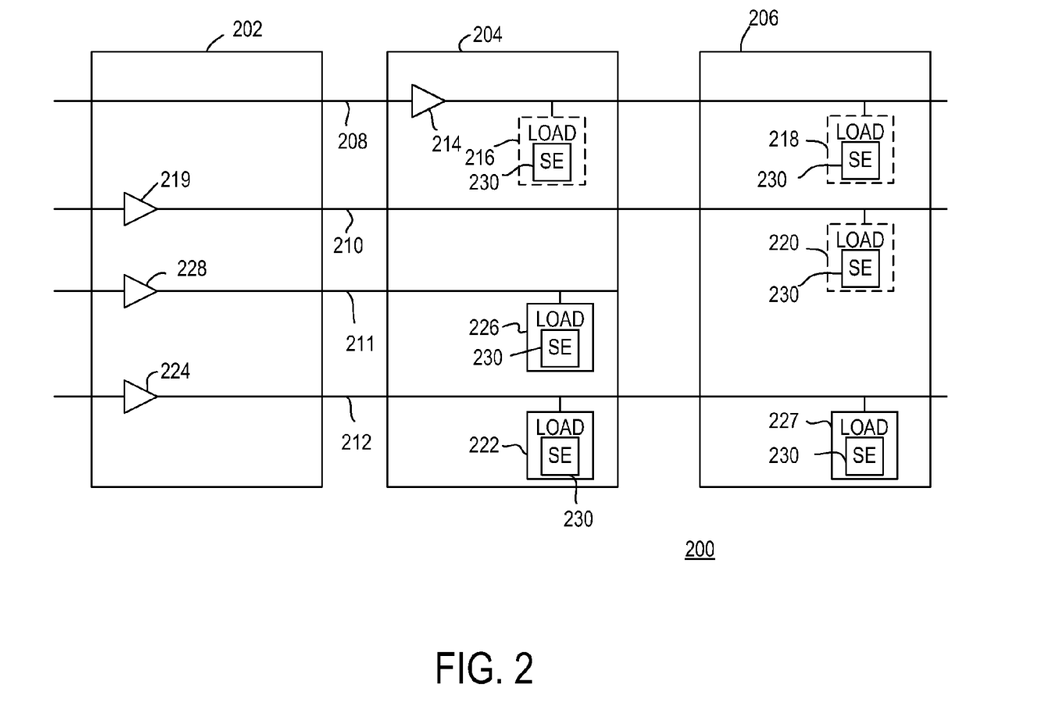
FIG. 2 is a block diagram depicting a logic design according to some embodiments of the invention.

FIG. 2 is a block diagram depicting a logic design 200 according to some embodiments of the invention. The logic design 200 includes three power domains 202, 204, and 206.

Each of the power domains 202, 204, and 206 include one or more input nets (e.g., wires), referred to as "primary inputs". The power domain 204 is shown as a switchable power domain responsive to a power control signal PC. Notably, the power domain 204 is shown by way of example as having primary inputs 208, 210, 211, and 212. A given power domain may have more or less than four primary inputs. The primary input 208 is coupled to driving logic 214 within the power domain 204. A "driving logic" is generally configured to drive load logic with a logic '0' or a logic '1'. Output of driving logic may change state between logic '0' and logic '1'. Driving logic may include various combinatorial logic elements, synchronous logic elements, asynchronous logic elements, or the like. Synchronous logic elements in driving logic are responsive to one or more clock signals (not shown). Driving logic may be responsive to input from other power domains of the logic design. Output of driving logic may be provided to other power domains. Thus, the driving logic 214 may be responsive to input from the power domain 202, and may provide output to the power domain 206.

In some cases, the driving logic 214 may drive load logic 216 in the power domain 204. Load logic is generally configured to sink a logic '0' or a logic '1' provided by driving logic. For example, load logic may include various combinatorial logic elements, synchronous logic elements, asynchronous logic elements, or the like. Synchronous logic elements in load logic are responsive to one or more clock signals (not shown). In particular, load logic may include one or more state elements 230 that retain a state (e.g., flip-flops). In some cases, the driving logic 214 may drive load logic 218 in the power domain 206.

The primary input 210 is not coupled to any driving logic or load logic in the power domain 204. The primary input 210 may be coupled to driving logic 219 in the power domain 202, and may be coupled to load logic 220 in the power domain 206.

The primary input 211 is coupled to load logic 226 in the power domain 204. The primary input 211 may be coupled to driving logic 228 in the power domain 202. The primary input 211 is not coupled to another load logic other than the load logic 226.

The primary input 212 is coupled to load logic 222 in the power domain 204 and load logic 227 in the power domain 206. The primary input 212 may be coupled to driving logic 224 in the power domain 202.

In a complex logic design, power domains can be structured in a hierarchical fashion, where domains are nested. Thus, some nets can pass from a driving domain through intermediate domain(s) before reaching its load domain(s). Such intermediate domains are called "passed-through domains" and such nets are called "pass-through nets". A defining characteristic of a pass-through net is that a pass-through net does not have driving logic in the passed-through power domain. In particular, there are two types of pass-through nets of interest: a pure pass-through net and a general pass-through net. If a pass-through net includes neither driving logic nor load logic in the passed-through power domain, then the pass-through net is a pure pass-through net. If a pass-through net includes load logic in both the passed-through domain and one or more other domains, then the pass-through net is a general-pass through net. In a case with a pass-through net includes load logic in the passed-through domain only, then the pass-through net is referred to herein as an "excluded pass-through net".

Assume a perspective of the power domain 204. Since the primary input 208 includes the driving logic 214 in the power domain 204, then the primary input 208 is not a pass-through net.

Since the primary input 210 does not include driving logic in the power domain 204, then the primary input 210 is a pass-through net. Further, since the primary input 210 does not include load logic in the power domain 204, then the primary input 210 is a pure-pass through net.

Since the primary input 211 does not include driving logic in the power domain 204, then the primary input 212 is a pass-through net. Since the primary input 211 is only coupled to the load logic 226 in the power domain 204, then primary input 212 is an excluded pass-through net.

Since the primary input 212 does not include driving logic in the power domain 204, then the primary input 212 is a pass-through net. Since the primary input 212 is coupled to both the load logic 222 in the domain 204 and the load logic 226 in the domain 206, then the primary input 212 is a general pass-through net.

Figure 3:
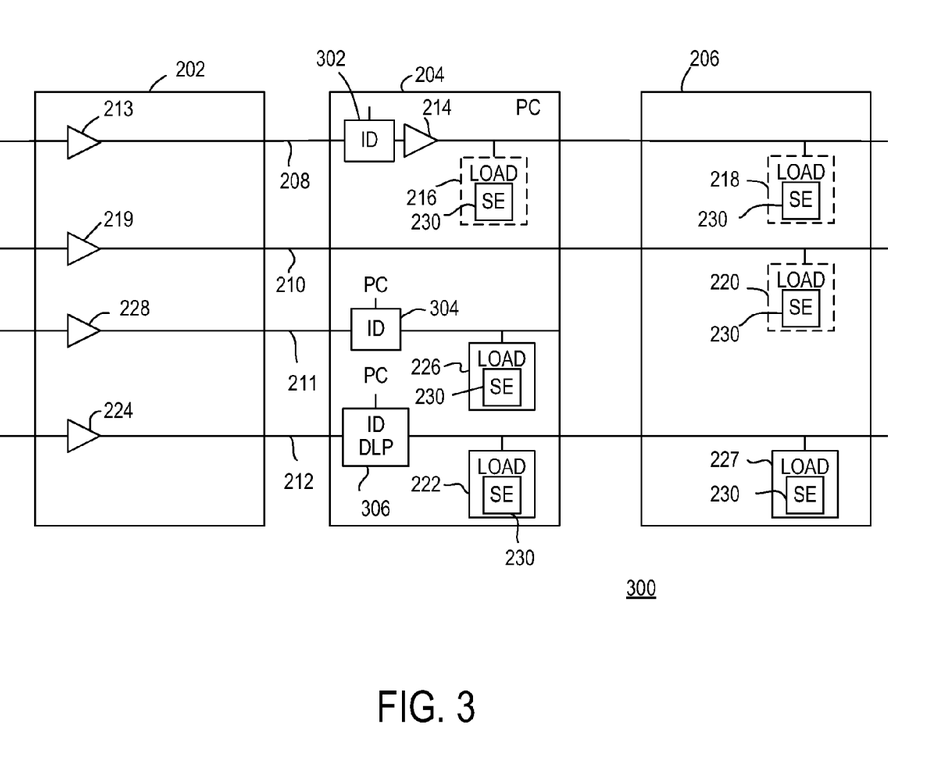
FIG. 3 is a block diagram depicting a logic design after being processed by a simulation tool according to some embodiments of the invention.

Returning to FIG. 1, the simulation tool 150 compensates for PSO in the logic design by selectively inserting an implicit device at the primary inputs of a switchable power domain. FIG. 3 is a block diagram depicting a logic design 300 after being processed by the simulation tool 150 according to some embodiments of the invention. The logic design 300 is similar to the logic design 200, but has been processed to selectively insert implicit devices at the primary inputs of the power domain 204, which is a switchable power domain. First, the general operation of an implicit device is described. Then, the process for selecting which primary inputs receive an implicit device is described.

As shown in FIG. 3, the primary input 208 includes an implicit device (ID) 302 coupled in series with the output of the driving logic 213 and the input of driving logic 214. The implicit device 302 is also configured to receive the power control signal PC. The implicit device 302 operates as follows: The output of the implicit device 302 drives a corrupting state 'x' on the primary input 208 when the power domain 204 is in the powered-off state. A corrupting state represents a state where the power is off ("undefined state"). When the power domain 204 is in the powered-on state, the implicit device 302 acts as a bypass channel to pass whatever logic value(s) are generated by the driving logic 213 ("bypassing state").

When the power is switched from off to on in the power domain 204, the output of the implicit device 302 will transition from the corrupt state 'x' to the logic value of the driving logic 213. This transition will create an event in the simulation tool 150 that will trigger re-evaluation of load logic on the primary input 208. In particular, the event will result in the outputs of combinatorial logic to reflect its inputs, and the state of sequential logic to reflect its set/reset state. This logic "bring-up" process is an iterative process: the logic transitions at the primary input 208 lead to logic transitions at internal load logic in the power domain 204 (e.g., the load logic 216), which in turn lead to logic transitions at downstream load logic in other power domain(s) (e.g., the load logic 218 in the power domain 206). This ripple effect will continue until all load logic responsive to the primary input 208 has been re-evaluated and properly brought-up. When this process is completed, logic bring-up of the previously powered-down domain (i.e., the domain 204) is achieved.

As noted above, a defining characteristic of a pass-through net is that the pass-through net does not have driving logic in the passed-through domain. As a result, if an implicit device was inserted at the primary input of a passed-through domain, the implicit device can potentially lead to incorrect circuit behavior during simulation for domains other than the passed-through domain. Thus, according to aspects of the invention, the simulation tool 150 is configured to identify pass-through nets and selectively insert the implicit logic devices on the primary inputs of a switchable power domain. In particular, implicit logic devices are not inserted on primary inputs that are pure pass-through nets, since the power domain does not include load logic that needs to be brought-up when the power domain is powered-up. Implicit logic devices can be inserted on primary inputs that are excluded pass-through nets, since there is no load logic outside of the power domain that can be affected. An implicit logic device can be inserted on primary inputs that are general pass-through nets, but the implicit device should include a modification, as discussed below. The modified implicit logic device is described below.

According to the selection rules described above, the primary input 208 receives the implicit device 302, as described above, since the primary input 208 is not a pass-through net. The primary input 210 is a pass-through net, in particular, a pure pass-through net. Thus, an implicit device is not inserted on the primary input 210 in the power domain 204. The primary input 211 is a pass-through net, in particular, an excluded pass-through net. Thus, an implicit device 304 is inserted on the primary input 211. The primary input 212 is a pass-through net, in particular, a general pass-through net. Thus, an implicit device 306 is inserted on the primary input 212. The implicit device 304 functions identically as the implicit device 302. The implicit device 306 functions as described below.

Notably, the implicit device 306 includes a mechanisms referred to as a direct linked port (DLP). With DLP enabled, the output of implicit device 306 continues to drive the load logic 222 similar to an implicit device without DLP enabled (e.g., the implicit devices 302 and 304). However, with DLP enabled, the implicit device 306 provides a bypass of the primary input 212 to load logic(s) in other domains, e.g., the load logic 226 in the power domain 204. Thus, the load logic(s) in other domains are not responsive to output of the implicit device 306. In this manner, load logic(s) outside the power domain 304 will not be impacted by the output of the implicit device 306 when the implicit device 306 outputs a corrupting state during power-off of the domain 204. This aspect is important if the downstream power domain(s) are still powered-on and would not function correctly if driven by a corrupted state. The implicit devices 302 and 304 are not DLP enabled and thus do not require DLP related logic. The implicit logic devices 302-306 may be constructed using various types of logic elements in order to perform the functions described above.

Figure 4:
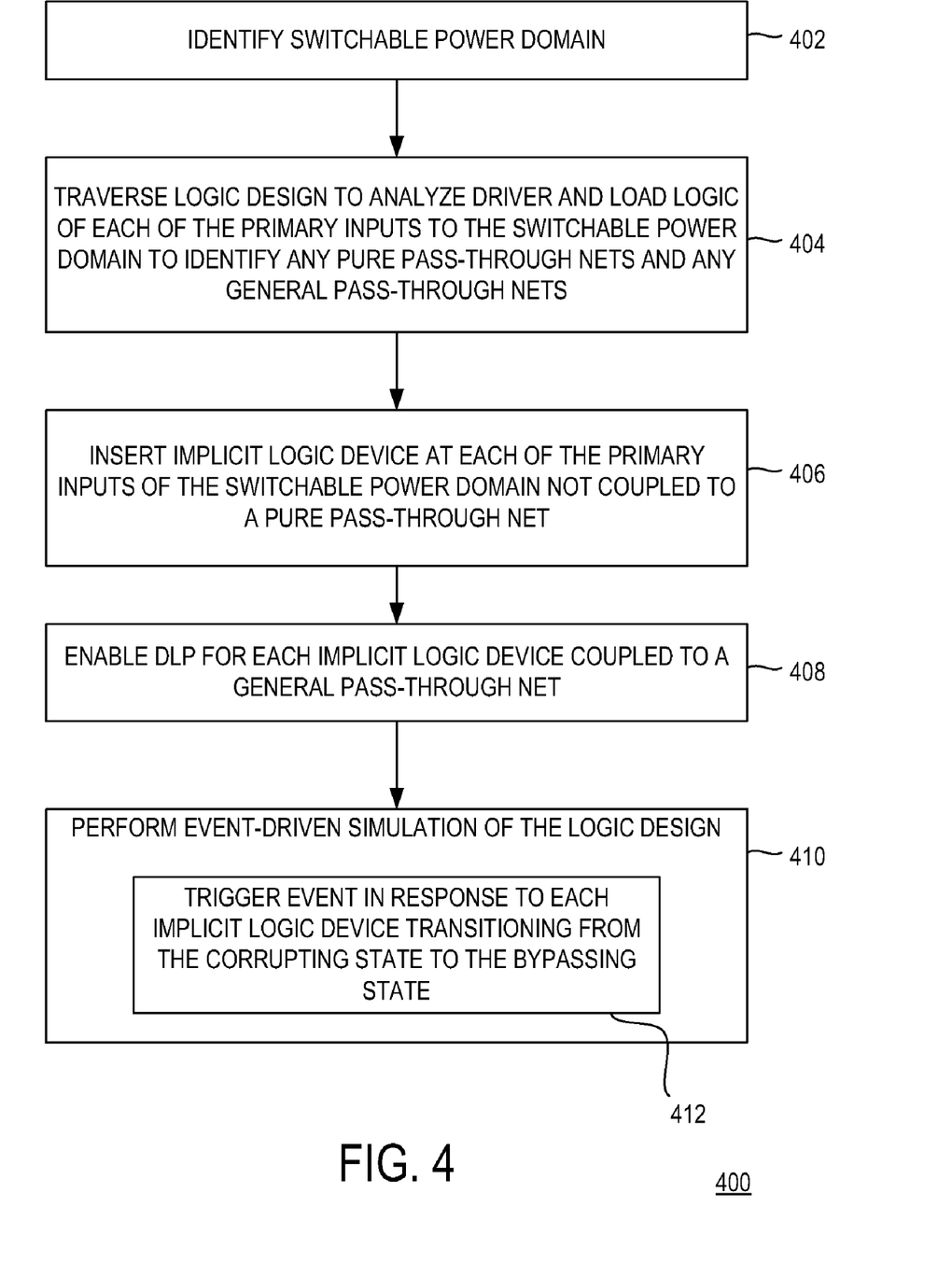
FIG. 4 is a flow diagram depicting a method for simulating a logic design having power domains according to some embodiments of the invention.

FIG. 4 is a flow diagram depicting a method 400 for simulating a logic design having power domains according to some embodiments of the invention. The method 400 begins at step 402, where a switchable power domain of the power domains is identified. At step 404, the logic design is traversed to analyze driver and load logic of each of the primary inputs to the switchable power domain to identify any pure pass-through nets and any general pass-through nets. At step 406, an implicit logic device is inserted at each of the primary inputs of the switchable power domain not coupled to a pure pass-through net. At step 408, DLP is enabled for each implicit logic device coupled to a general pass-through net. At step 410, an event-driven simulation of the logic design is performed. During step 410, at step 412, an event is triggered in response to each implicit logic device transitioning from the corrupting state to the bypassing state such that each state element in the switchable power domain re-evaluates its state.

As noted above, during PSO simulation, logic corruption semantics are achieved through driving a corrupting state (logic 'x') to state elements in a power domain. Both the corruption of state elements and the operation of the implicit devices at the primary inputs of a power domain are turned on and off by the same power control (e.g., the power control signal PC). While these two will always be performed in the same simulation cycle of the simulation tool 150, a delicate scheduling issue exists as to the order the two should be performed. In some aspects of the invention, the simulation tool 150 implements a scheduling scheme where: at the time of power off, the order of turning on the implicit devices and corrupting the state elements is random. However, at the time of power on, the simulation tool 150 implements a specific order whereby the corruption of state elements is disabled first before the corruption by the implicit devices is turned off. This scheme ensures that the load logic that needs to be brought-up upon power up will be correctly brought-up (e.g., for the sequential elements with an asynchronous set/reset). For clarity by example, the method 400 is described with respect to one switchable power domain. It is to be understood that the method 400 may be performed for multiple switchable power domains in a logic design.

Figure 7:
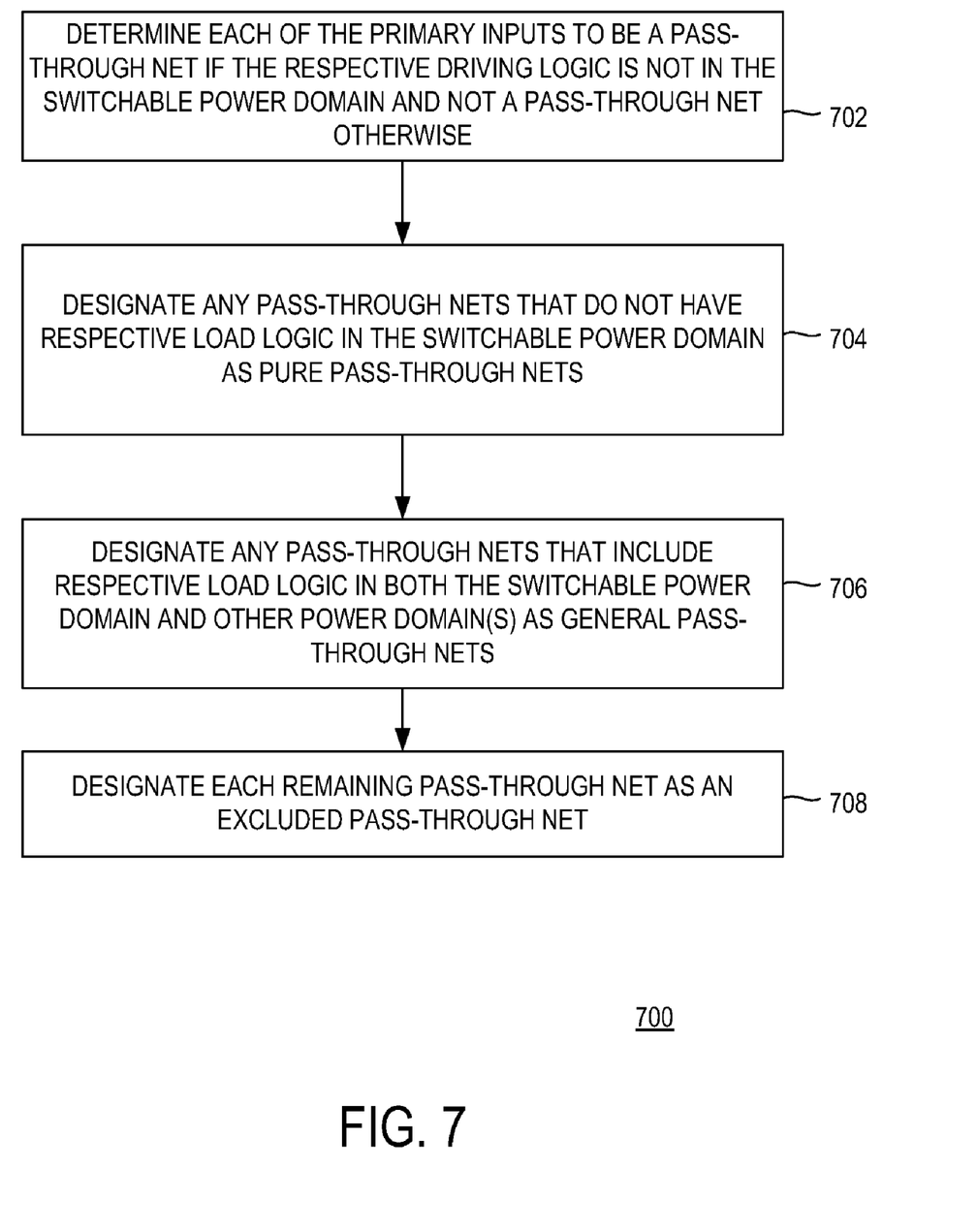
FIG. 7 is a flow diagram depicting a method for traversing the logic design according to some embodiments of the invention.

FIG. 7 is a flow diagram depicting a method 700 for traversing the logic design according to some embodiments of the invention. The method 700 may be performed during step 404. The method 700 begins at step 702, where each of the primary inputs to the switchable power domain is determined to be a pass-through net if the respective driving logic is not in the switchable power domain and not a pass-through net otherwise. At step 704, any pass-through nets that do not have respective load logic in the switchable power domain are designated as a pure-pass through nets. At step 706, any pass-through nets that include respective load logic in both the switchable power domain and at least one other power domain are designated as general-pass through nets. At step 708, each remaining pass-through net is designated as an excluded pass-through net.

Figure 5:
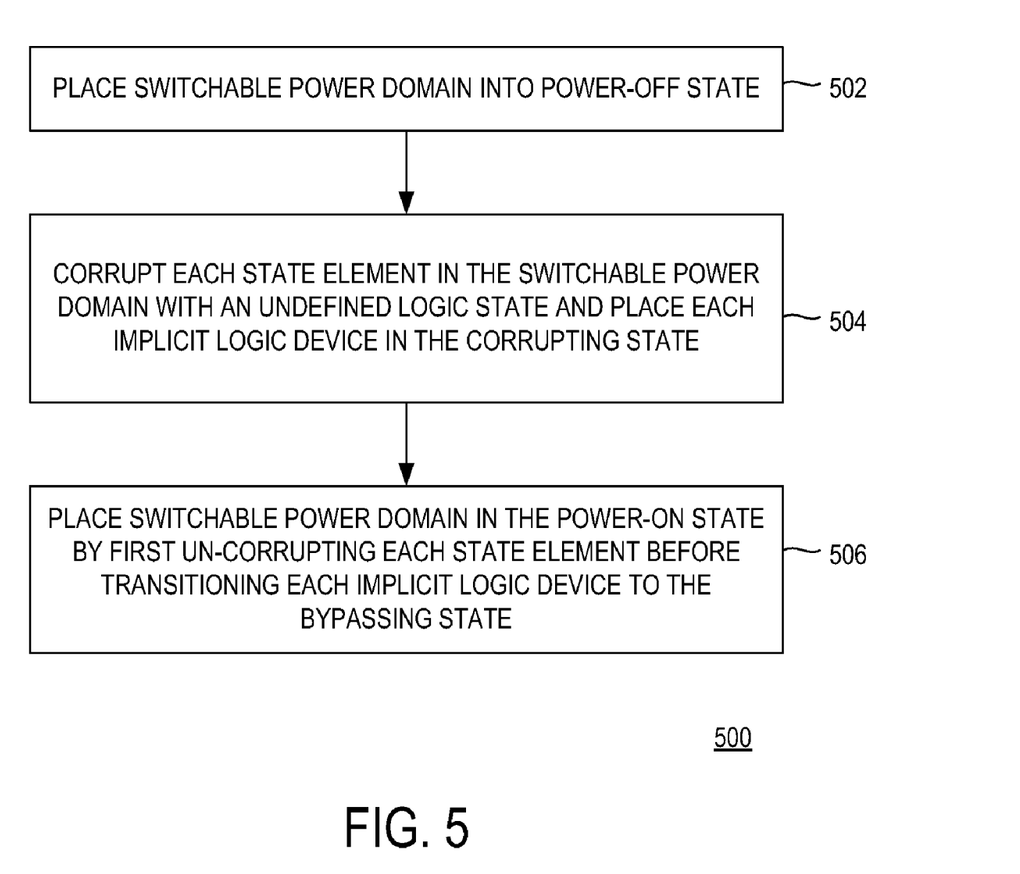
FIG. 5 is a flow diagram depicting a method of simulation according to some embodiments of the invention.

FIG. 5 is a flow diagram depicting a method 500 of simulation according to some embodiments of the invention. The method 500 may be performed during the event-driven simulation of step 410 in the method 400 to implement the scheduling scheme described above. At step 502, the switchable power domain is placed into the power-off state. At step 504, each state element in the switchable power domain is corrupted with an undefined logic state and each implicit logic device is placed in the corrupting state. The order of these two functions in step 504 can be random. At step 506, the switchable power domain is placed in the power-on state by first un-corrupting each state element in the switchable power domain before each implicit logic device transitions from the corrupting state to the bypassing state.

Performance is generally a critical benchmark for event-driven logic simulation systems. According to some aspects of the invention, two mechanisms can be deployed to improve performance. The first mechanism is a combination device that combines the implicit logic device described above with an isolation device. As it is normally the case with PSO designs, isolation is required for signals that cross power domains. Isolation behavior can be simulated as a special device that when the isolation control is on, the device will drive a special clamp value (e.g., such as logic high or logic low) to its output and to the downstream logic. The isolation device can be specified and applied to either the primary inputs or the outputs of a power domain. When isolation devices are applied to the primary inputs of the power domain, the isolation devices can provide for logic and electrical isolation for logic loads inside the powered-on domain from corrupted driving logic in a powered-off domain. When a power domain is switchable, implicit devices can be selectively inserted on the primary inputs, as described above. This process can lead to two devices being applied to the same primary inputs (i.e., implicit logic device and isolation device). Accordingly, in some embodiments, an implicit logic device can include an isolation feature.

Figure 6:
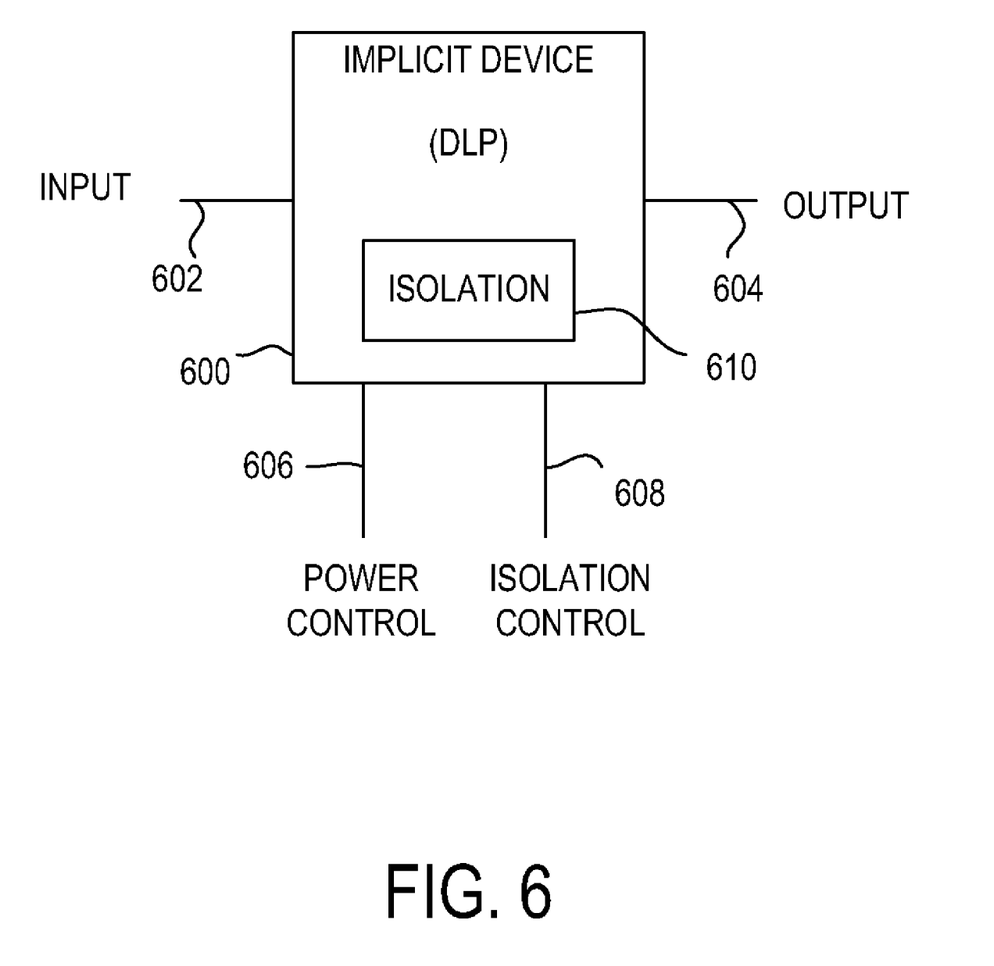
FIG. 6 is a block diagram depicting an implicit logic device with an isolation feature according to some embodiments of the invention.

FIG. 6 is a block diagram depicting an implicit logic device 600 with an isolation feature according to some embodiments of the invention. The implicit logic device 600 includes an input 602, and output 604, a power control input 606, an isolation control input 608, and isolation logic 610. The input 602 is configured to be coupled to driving logic. The output 604 is configured to be coupled to load logic. The power control input 606 is configured to receive a power control signal. The isolation control input 608 is configured to receive an isolation control signal. The implicit logic device 600 operates similar to the implicit logic devices 302-306 with respect to the power control. That is, if the isolation control signal is not enabled, the implicit logic device 600 operates identically as the implicit logic devices 302-306. If the isolation control signal is enabled and the power control is not enabled, then the output of the implicit logic device 600 is the clamped isolation output (e.g., either a logic low or logic high). If both the isolation control signal and the power control signal are enabled, then the implicit logic device 600 operates identically to the implicit logic devices 302-306. The implicit logic device 600 can also include the DLP mechanism described above. For such a case, if both the isolation control signal and the power control signal are enabled, the DLP mechanism will provide a bypass of the clamped isolation output to the load logic(s) in other domains. In this manner, the implicit logic device 600 can be used in place of the implicit logic devices 302-306 described above. The implicit logic device 600 reduces the required memory footprint of the simulation tool 150 and needs only one event triggering to achieve either isolation or primary input corruption.

A power domain can have a large number of primary inputs, each of which may require an implicit device, as described above. In the simulation tool 150, each implicit logic device can have its own process that is sensitive to the power control signal. In a nominal scheme of event-driving simulation, each process will have its own method listening to the power control signal. Whenever the power control signal toggles, the method will be executed to schedule the process for execution (i.e., the implicit logic device performs its function). This scheme results in the same number of listening methods to be created and to be executed as the number of implicit devices inserted in the logic design. In the case where a power domain has a large number of primary inputs, having a separate listening method for each implicit logic device potentially poses significant decrease in performance of the simulation tool 150. Thus, according to some aspects of the invention, the fact that all implicit logic devices for a given power domain share the same power switch control can be leveraged. The simulation tool 150 can include a batch scheduling mechanism to increase performance. Instead of each process having its own listening method, all processes for all implicit logic devices can share a single listening method for the power control signal. Furthermore, each primary input, its implicit device, and associated process can be pre-processed so that the batch listening method is aware of them. When a signal transition occurs at the power switch control signal, the batch listening method is executed to schedule all implicit logic device processes in one simulation cycle.

An aspect of the invention is implemented as a program product for use with a computer system. Program(s) of the program product includes functions of the embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive, hard-disk drive, read/writable CD, read/writable DVD, FLASH memory, or the like).

While the foregoing is directed to embodiments of the present invention, other and further embodiments of the invention may be devised without departing from the basic scope thereof, and the scope thereof is determined by the claims that follow.

What is claimed is:

1. A computer implemented method of simulating a logic design having power domains, comprising:
   identifying, using one or more processors, a switchable power domain of the power domains, the switchable power domain having primary inputs and having a power state switchable between a power-on state and a power-off state;
   traversing, using one or more processors, the logic design to analyze driver and load logic of each of the primary inputs to the switchable power domain to identify any pure pass-through nets each of which has no driver and no load logic in the switchable power domain;
   inserting, using one or more processors, an implicit logic device at each of the primary inputs not coupled to a pure pass-through net that does not have the driver and load logic in the switchable power domain, each implicit logic device being in a corrupting state when the switchable power domain is in the power-off state and in a bypassing state when the switchable power domain is in the power-on state, the corrupting state corrupting the respective primary input with an undefined logic state, the bypassing state driving the respective primary input with a logic state of respective driver logic; and
   performing, using one or more processors, an event-driven simulation of the logic design.

2. The method of claim 1, wherein performing comprises:
   placing the switchable power domain into the power-off state;
   corrupting each state element in the switchable power domain with an undefined logic state; and
   placing the switchable power domain into the power-on state by un-corrupting each state element in the switchable power domain before each implicit logic device transitions from the corrupting state to the bypassing state.

3. The method of claim 1, wherein each implicit logic device shares a single method for detecting the power state of the switchable power domain, the single method causing state of each implicit logic device to change in response to a change in the power state of the switchable power domain.

4. The method of claim 1, wherein each primary input of the switchable power domain further includes an isolation state switchable between enabled isolation and disabled isolation, and wherein each implicit logic device implements the isolation state of the respective primary input.

5. The method of claim 1, wherein traversing further comprises:
    identifying any general pass-through nets each of which has no driver logic in the switchable power domain, and has load logic in both the switchable power domain and at least one power domain other than the switchable power domain; and
    the method further comprising:
        inserting a directly linked port (DLP) for each general pass-through net that directly links the respective driver logic with the respective load logic in the power domain other than the switchable power domain.

6. The method of claim 1, wherein performing comprises:
    triggering an event in response to each implicit logic device transitioning from the corrupting state to the bypassing state; and
    wherein each state element in the switchable power domain re-evaluates state in response to the event.

7. The method of claim 1, wherein traversing comprises:
    determining each of the primary inputs to be a pass-through net if the respective driving logic is not in the switchable power domain and not a potential pass-through net otherwise;
    designating each potential pass-through net as a pure pass-through net if the respective load logic is not in the switchable power domain;
    designating each potential pass-through net as a general pass-through net if the respective load logic is in both the switchable power domain and at least one power domain other than the switchable power domain; and
    designating each pass-through net as an excluded pass-through net if not a pure-pass through net or a general pass-through net.

8. An apparatus for simulating a logic design having power domains, comprising:
    means for identifying, using one or more processors, a switch able power domain of the power domains, the switchable power domain having primary inputs and having a power state switchable between a power-on state and a power-off state;
    means for traversing, using one or more processors, the logic design to analyze driver and load logic of each of the primary inputs to the switchable power domain to identify any pure pass-through nets each of which has no driver and no load logic in the switchable power domain;
    means for inserting, using one or more processors, an implicit logic device at each of the primary inputs not coupled to a pure pass-through net that does not have the driver and load logic in the switchable power domain, each implicit logic device being in a corrupting state when the switchable power domain is in the power-off state and in a bypassing state when the switch able power domain is in the power-on state, the corrupting state corrupting the respective primary input with an undefined logic state, the bypassing state driving the respective primary input with a logic state of respective driver logic; and
    means for performing, using one or more processors, an event-driven simulation of the logic design.

9. The apparatus of claim 8, wherein the means for performing comprises:
    means for placing the switchable power domain into the power-off state;
    means for corrupting each state element in the switchable power domain with an undefined logic state;
    means for placing the switchable power domain into the power-on state by uncorrupting each state element in the switchable power domain before each implicit logic device transitions from the corrupting state to the bypassing state.

10. The apparatus of claim 8, wherein each implicit logic device shares a single method for detecting the power state of the switchable power domain, the single method causing state of each implicit logic device to change in response to a change in the power state of the switchable power domain.

11. The apparatus of claim 8, wherein each primary input of the switchable power domain further includes an isolation state switchable between enabled isolation and disabled isolation, and wherein each implicit logic device implements the isolation state of the respective primary input.

12. The apparatus of claim 8, wherein the means for traversing further comprises:
    means for identifying any general pass-through nets each of which has no driver logic in the switchable power domain, and has load logic in both the switchable power domain and at least one power domain other than the switchable power domain; and
    the apparatus further comprising:
        means for inserting a directly linked port (DLP) for each general pass-through net that directly links the respective driver logic with the respective load logic in the power domain other than the switchable power domain.

13. The apparatus of claim 8, wherein the means for performing comprises:
    means for triggering an event in response to each implicit logic device transitioning from the corrupting state to the bypassing state;
    wherein each state element in the switchable power domain re-evaluates state in response to the event.

14. The apparatus of claim 8, wherein the means for traversing comprises:
    means for determining each of the primary inputs to be a pass-through net if the respective driving logic is not in the switchable power domain and not a potential pass-through net otherwise;
    means for designating each potential pass-through net as a pure pass-through net if the respective load logic is not in the switchable power domain;
    means for designating each potential pass-through net as a general pass-through net if the respective load logic is in both the switchable power domain and at least one power domain other than the switchable power domain; and
    means for designating each pass-through net as an excluded pass-through net if not a pure-pass through net or a general pass-through net.

15. A non-transitory computer readable medium having instructions stored thereon that when executed by a processor cause the processor to perform a method of simulating a logic design having power domains, comprising:
    identifying, using one or more processors, a switchable power domain of the power domains, the switchable power domain having primary inputs and having a power state switchable between a power-on state and a power-off state;
    traversing, using one or more processors, the logic design to analyze driver and load logic of each of the primary inputs to the switch able power domain to identify any pure pass-through nets each of which has no driver and no load logic in the switchable power domain;
    inserting, using one or more processors, an implicit logic device at each of the primary inputs not coupled to a pure pass-through net that does not have the driver and load logic in the switchable power domain, each implicit logic device being in a corrupting state when the switchable power domain is in the power-off state and in a bypassing state when the switchable power domain is in the power-on state, the corrupting state corrupting the respective primary input with an undefined logic state, the bypassing state driving the respective primary input with a logic state of respective driver logic; and performing, using one or more processors, an event-driven simulation of the logic design.

16. The non-transitory computer readable medium of claim 15, wherein performing
comprises:
   placing the switchable power domain into the power-off state;
   corrupting each state element in the switchable power domain with an undefined logic state; and
   placing the switchable power domain into the power-on state by un-corrupting each state element in the switchable power domain before each implicit logic device transitions from the corrupting state to the bypassing state.

17. The non-transitory computer readable medium of claim 15, wherein each implicit logic device shares a single method for detecting the power state of the switchable power domain, the single method causing state of each implicit logic device to change in response to a change in the power state of the switchable power domain.

18. The non-transitory computer readable medium of claim 15, wherein each primary input of the switchable power domain further includes an isolation state switch able between enabled isolation and disabled isolation, and wherein each implicit logic device implements the isolation state of the respective primary input.

19. The non-transitory computer readable medium of claim 15, wherein the step of traversing further comprises:
   identifying any general pass-through nets each of which has no driver logic in the switchable power domain, and has load logic in both the switchable power domain and at least one power domain other than the switchable power domain; and
the method further comprising:
   inserting a directly linked port (DLP) for each general pass-through net that directly links the respective driver logic with the respective load logic in the power domain other than the switchable power domain.

20. The non-transitory computer readable medium of claim 15, wherein traversing
comprises:
   determining each of the primary inputs to be a pass-through net if the respective driving logic is not in the switchable power domain and not a potential pass-through net otherwise;
   designating each potential pass-through net as a pure pass-through net if the respective load logic is not in the switchable power domain;
   designating each potential pass-through net as a general pass-through net if the respective load logic is in both the switchable power domain and at least one power domain other than the switchable power domain; and
   designating each pass-through net as an excluded pass-through net if not a pure-pass through net or a general pass-through net.

* * * * *